No. 618,016. Patented Jan. 17, 1899.
M. SPITZER.
CUTTING AND FOLDING MACHINE.
(Application filed Aug. 7, 1895.)
(No Model.) 6 Sheets—Sheet 4.
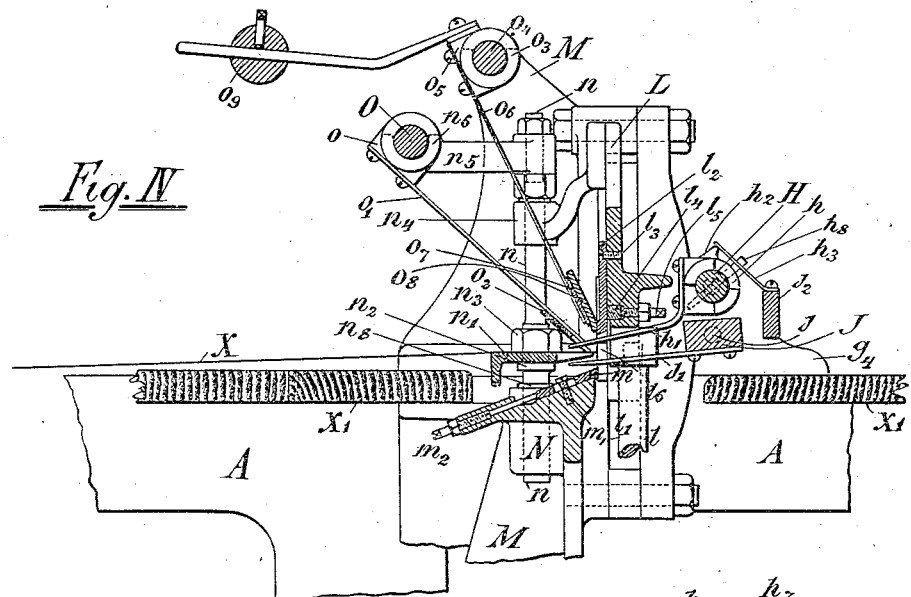
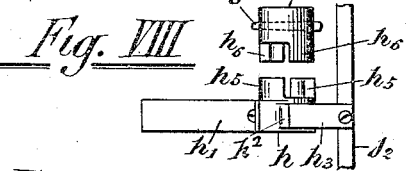
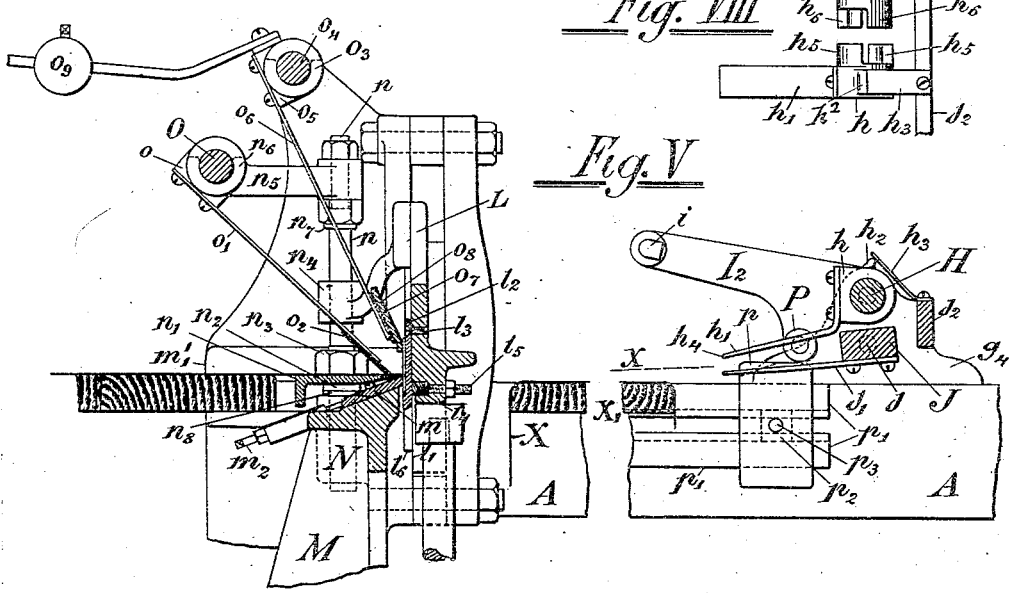
WITNESSES:
INVENTOR
Maurice Spitzer

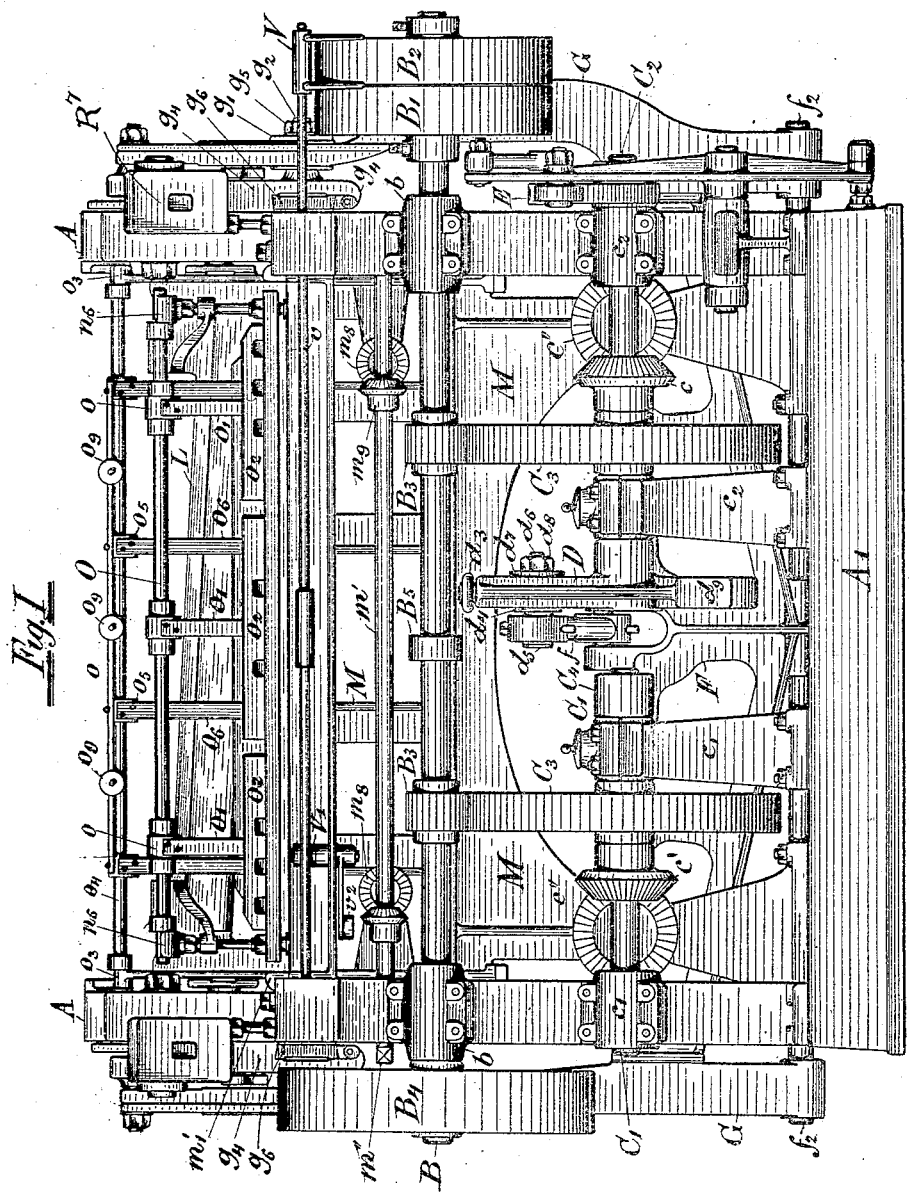

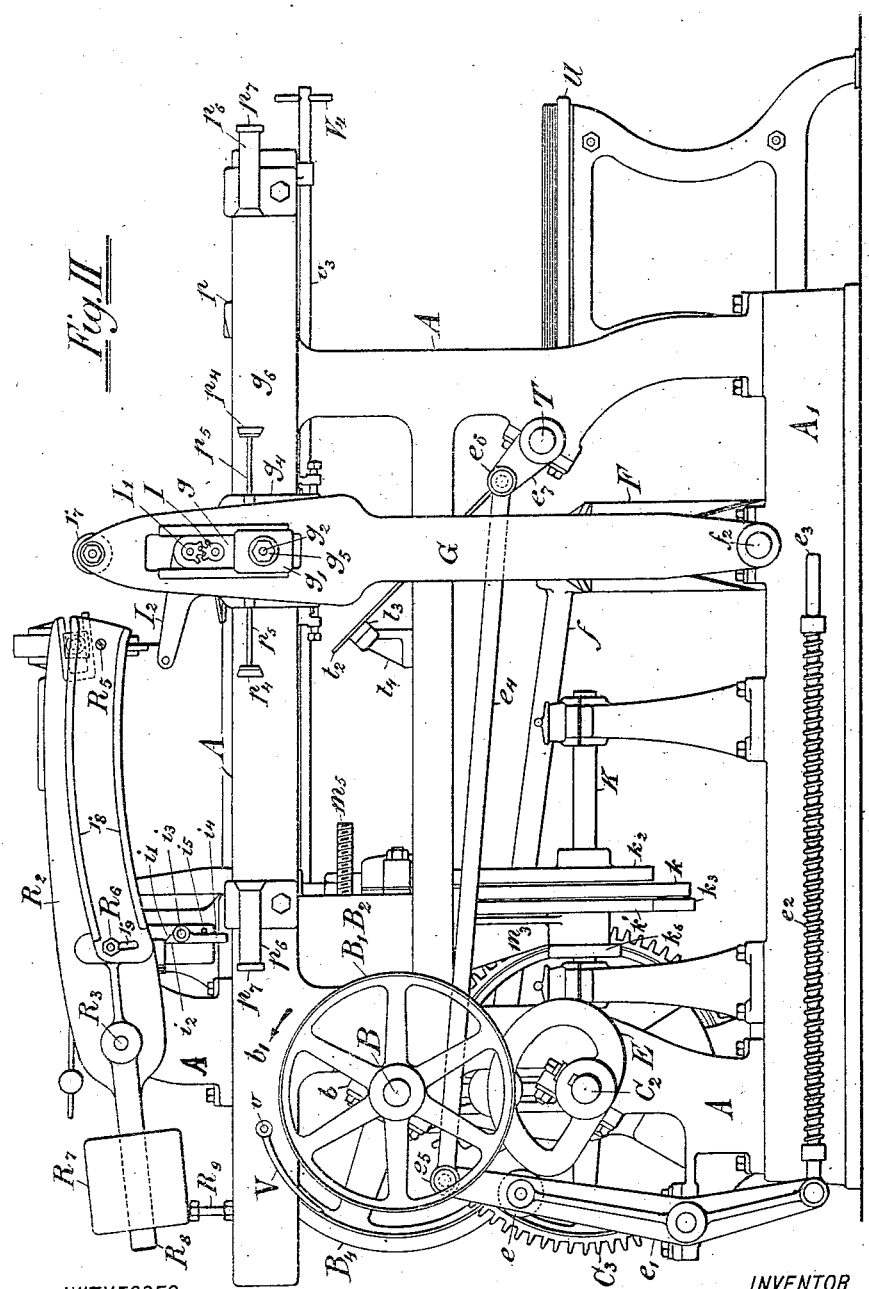

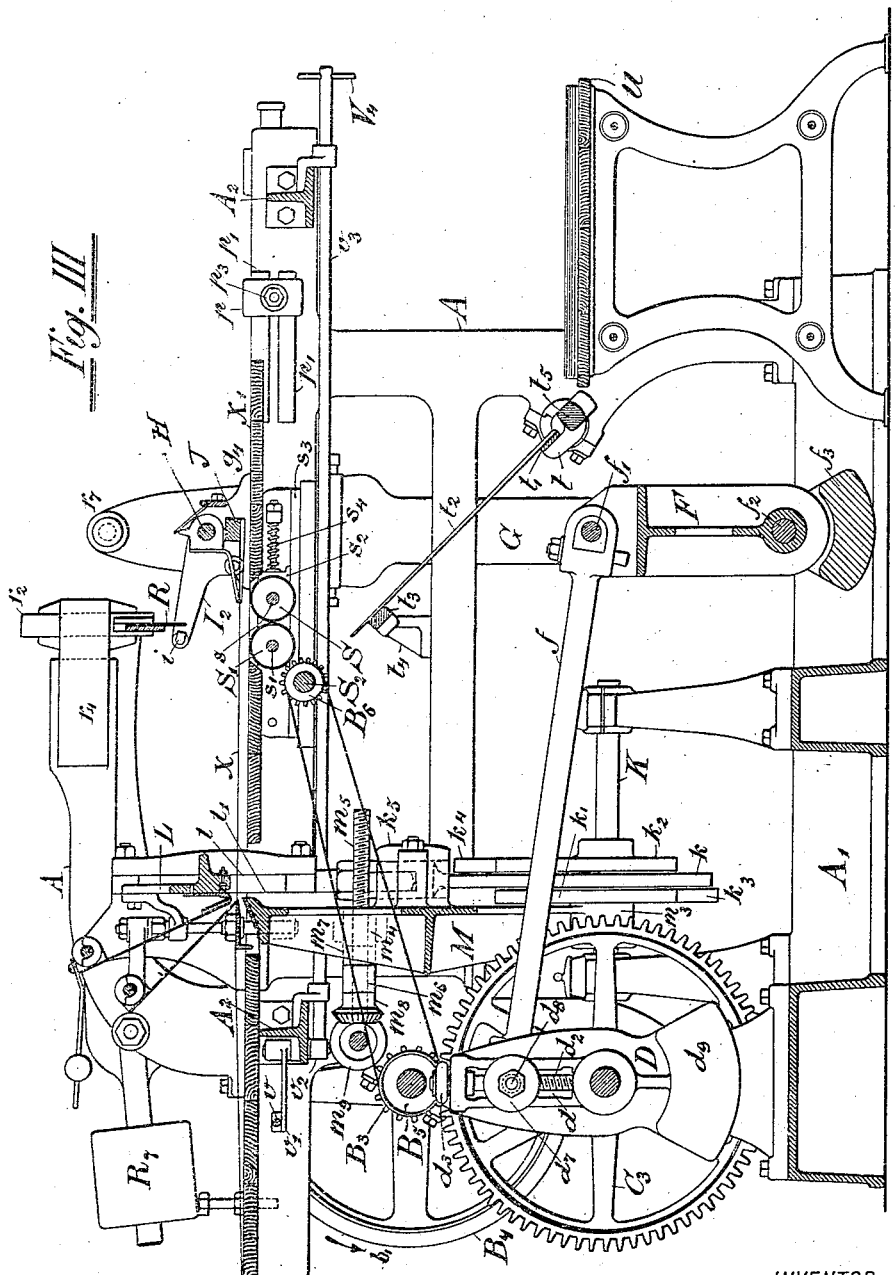

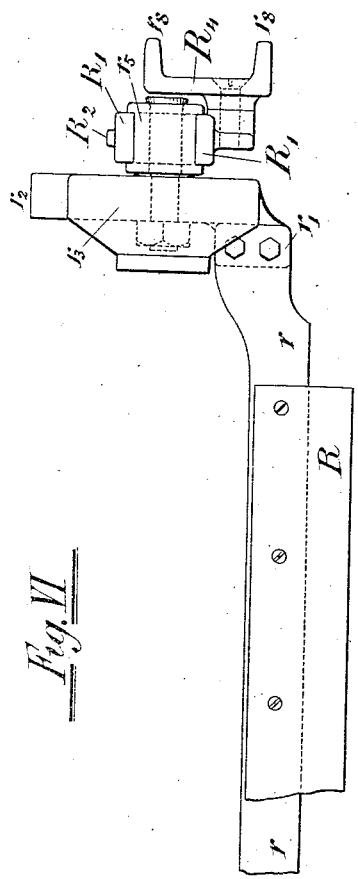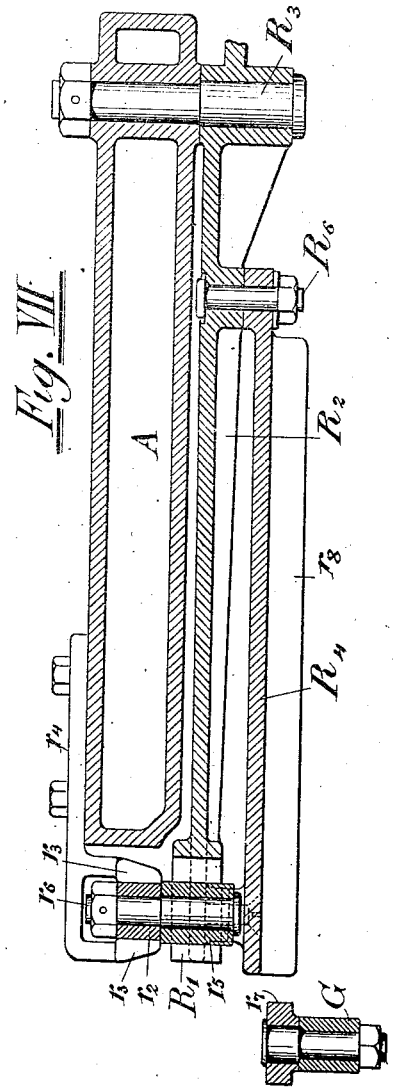

No. 618,016. Patented Jan. 17, 1899.
M. SPITZER.
CUTTING AND FOLDING MACHINE.
(Application filed Aug. 7, 1895.)
(No Model.) 6 Sheets—Sheet 6.
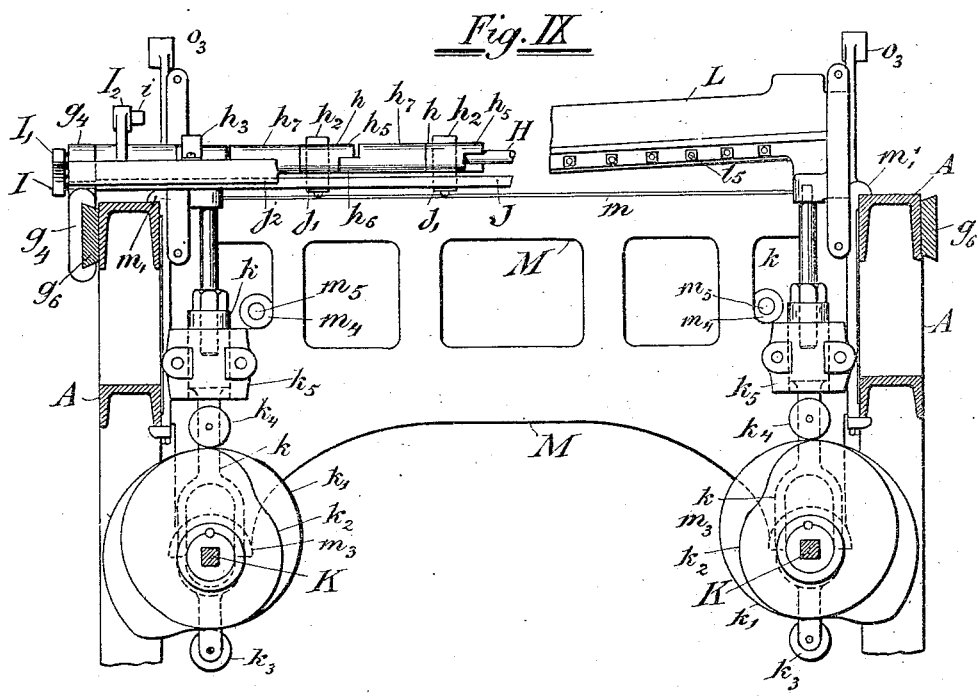
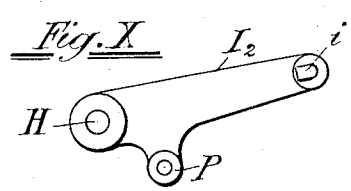
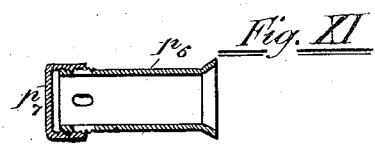
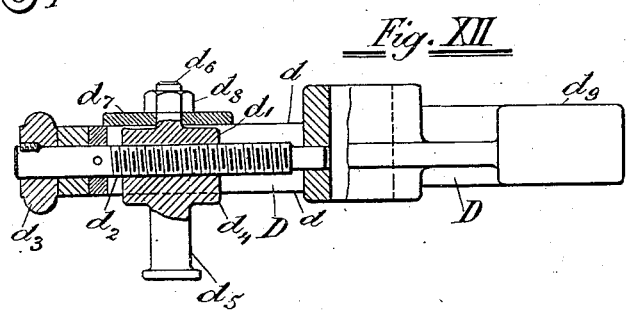
Witnesses
Josephine Miché
N. Bleier
Inventor
Maurice Spitzer
By Harry Coll Kennedy
Attorney

UNITED STATES PATENT OFFICE.

MAURICE SPITZER, OF CHICAGO, ILLINOIS.

CUTTING AND FOLDING MACHINE.

SPECIFICATION forming part of Letters Patent No. 618,016, dated January 17, 1899.

Application filed August 7, 1895. Serial No. 558,524. (No model.)

*To all whom it may concern:*

Be it known that I, MAURICE SPITZER, a native of Austria-Hungary, but now a citizen of the United States, and a resident of the city of Chicago, in the county of Cook, in the State of Illinois, have invented a new and useful Improvement in Cutting and Folding Machines, of which the following is a full, clear, and exact description, reference being had to the accompanying drawings, forming part of this specification.

My invention relates to that class of cutting and folding machines, which cut off the desired length and fold the same in the middle, of any flexible material—such as paper, linen, cloth, burlap, &c.—which might originally be sheeted or rolled in great lengths. It is also provided with a fly to receive the folded sheets and to place them on a suitable receptacle.

The details of my invention will be more fully hereinafter set forth.

In the accompanying drawings, Figure 1 is a front elevation of my improved machine; Fig. 2, a side elevation; Fig. 3, a sectional elevation; Fig. 4, a sectional detail of the knives, oiler, holddown-fingers, and gripping mechanism. Fig. 5 is a vertical longitudinal section of the knives during the cutting operation and of the gripping mechanism after dropping the sheet; Fig. 6, a front elevation of folding-blade and guide; Fig. 7, a sectional plan of the folding mechanism. Fig. 8 is a detail of the gripping mechanism. Fig. 9 is a fragmentary vertical transverse section taken on the line 9 9 of Fig. 3 when the gripping mechanism is situated adjacent to the knife. Fig. 10 is a detail side elevation of the lever 12. Fig. 11 is a detail longitudinal section of the cushioning-cylinder. Fig. 12 is a detail longitudinal section of the adjustable crank D.

Like letters of reference indicate identical parts in the different figures.

The main body of the machine is built with two side frames A A, the bed-plate A', and the cross-girders $A^2$, Figs. 1, 2, and 3.

The main or driving shaft B is received in the boxes $b$ and carries the tight pulley B', the loose pulley $B^2$, the pinion-gears $B^3$, the fly-wheel $B^4$, and the pulley $B^5$, which are set in rotation by means of a belt on the pulley B', driven in the direction indicated by the arrow $b'$. The motion of the driving-shaft is transmitted by the gearing $B^3 C^3$ to the shafts C' and $C^2$, and they are firmly supported in the boxes $c'$ $c'$ and $c^2$ $c^2$.

On the shaft $C^2$ are keyed the adjustable crank D, the cam E, and the bevel-gear $c$, while on the shaft C' are the bevel-gear $c$ and the collar C'.

The crank D is provided with a slot $d$ to receive the slide $d'$, and the same can be adjusted by the spindle $d^2$ and the hand-wheel $d^3$. The slide $d'$ (shown in Fig. 12) is provided on one side with the shoulder $d^4$ and the crank-pin $d^5$ and on the other side with the stud $d^6$, which with the washer $d^7$ and nut $d^8$ serve to firmly secure the slide $d'$ after being adjusted by clamping the sides of the slot $d$ between the shoulder $d^4$ and the washer $d^7$. The whole construction is counterbalanced by the weight $d^9$.

On the crank-pin $d^5$ is pivoted one end of the connecting-rod $f$, while the other end of said connecting-rod is pivoted to the pin $f'$ of the cross-piece F. The cross-piece F is keyed to the rocking shaft $f^2$ and is given by the above construction a swinging motion, the span of which is regulated by the location of the slide $d'$ and its crank-pin $d^5$ on the crank D.

The swinging motion of the cross-piece F is transferred to the levers G G, which are placed symmetrically on the outside of the frames A A. These levers are firmly bolted to the cross-piece F and keyed to the rocking shaft $f^2$. The weight $f^3$ is also keyed to the rocking shaft $f^2$ and counterbalances the cross-piece F and the levers G G. These levers are provided on their upper end with the slots $g$ $g$, and each of these receives a sliding piece $g'$, Figs. 1 and 2, in which is fitted the pivot $g^2$ of the cross-head $g^4$ and is secured by the nut $g^5$. As the machine is kept symmetrical, the same construction is repeated also on the other side of the machine. To transfer the swinging motion of the levers G G to the straight forward-and-back one of the cross-heads $g^4$ $g^4$, the same are suitably mounted on the guide-bars $g^6$, which are firmly fastened with countersunk screws to the sides of the frames A A.

The cross-heads $g^4$ $g^4$ carry the devices which pull the sheet out to the required length, and the extent of movement of said devices is regulated by the stroke of the said cross-heads $g^4$ $g^4$, which is controlled by the adjusting mechanism, regulated by hand-wheel $d^3$, as above described, and shown in Fig. 12.

To the cross-heads $g^4$ $g^4$ are attached the shaft H and the square bar J, Figs. 4 and 5, which is reduced at the ends to form the pivots $j j$. On each of these pivots is firmly mounted a toothed segment I, Fig. 2, whose cogs are received between the cogs of the corresponding segments I' on the shaft H. Any slight turn of the shaft H will by this arrangement produce an equal turn of the bar J, but in reverse direction. The gripping mechanism consists of two fingers placed over each other, the lower one, $j'$, being firmly screwed to the square bar J, while the upper one, $h'$, is screwed to the loose ring $h$. This ring is provided with a small extension $h^2$, on which the spring $h^3$ presses steadily, bringing the point $h^4$ of the finger $h'$ to the point of the finger $j'$ and causing a sufficient pressure between the points of the two fingers to obtain a firm grip of the sheet X, which extends between them. Pairs of these fingers are placed along the shaft H and the square bar J, with suitable spaces between them, so that the sheet X is held at intervals across its width. As each of the fingers $h'$ is pressed down with the end of a separate spring $h^3$, while the other end of said spring is screwed to the rod $j^2$, which connects the two cross-heads and is bolted to the same, I produce a firm grip between each pair of fingers independent from the other pairs.

In order to further provide for the independent action and the independent adjustment of the upper set of fingers $h'$ and at the same time so arrange them that they may all be opened simultaneously by a slight turn of the shaft H and closed independently by the action of their springs, the several fingers $h'$ are secured to the rings $h$, loosely strung on shaft H, and, as shown in Figs. 8 and 9, the said rings are provided with lugs $h^5$, which receive between them the lugs $h^6$ of the collars $h^7$. Said collars are secured to the shaft H by means of pins $h^8$, while the rings $h$ are slipped upon the shaft and are turned therewith through the instrumentality of the collars $h^7$. A slight clearance is allowed between the intermeshing lugs of the rings and collars, so that the shaft H may turn slightly without operating the fingers, and then by the engagement of the lugs of the collars with the lugs of the loose rings the several fingers $h'$ are simultaneously raised. The reaction of the springs $h^3$ operates to turn the shaft H and close the fingers, each spring acting upon its own clutch mechanism and permitting the fingers to separately adjust themselves, so as to insure a uniform gripping action.

The bevel-gears $c$ and $c'$ on the shafts C' C², Fig. 1, drive the bevel-gears $c''$ $c''$, which are rigid with the square shaft K, Figs. 3 and 9. On the shaft K is slipped a double cam $k'$ $k^2$, with the yoke $k$ between them. This yoke (shown in Fig. 9) has a long slot fitting the two sides of the hub of cam $k'$, so that the cam is able to turn without affecting the yoke $k$, and the yoke $k$ can slide up or down on the cam $k'$, but not sidewise. After yoke $k$ is slipped on the hub of cam $k'$ the second cam $k^2$ is slipped on the same hub and keyed to it. Consequently they will never change their relative position. The hub of cam $k'$ has also a square bore fitting the sides of the square shaft K, so that it can slide forward and back, but will have to turn with the square shaft K. On the yoke $k$ are pivoted the rollers $k^3$ and $k^4$, and the cams $k'$ and $k^2$ are so designed that they never leave their respective rollers $k^3 k^4$. By turning the shaft K the cam $k'$ will press on the roller $k^3$ or bring the yoke down, and later on the cam $k^2$ will press on the roller $k^4$ and will raise the yoke. The shapes of the cams $k^1$ and $k^2$ are so designed that they do not hinder the action of each other; furthermore, after a quick down motion, follows a slow up one, and the yoke stops on its upper position before it will be pulled down again.

The upper end of the yoke $k$ is round and is received in the box $k^5$, where one part of the side pressure caused by the action of the cams is taken up, and the other part of the side pressure is taken up in the slot of the yoke filling sidewise the hub of cam $k'$. Each yoke $k$ is rigidly connected with the knife-bar L, whose both ends slide in guides $l l'$. The guide $l'$ is part of the carriage M, while the guide $l$ is bolted to the same in such a way as to form a suitable slot to take in the end of the knife-bar L.

The upper knife $l^2$ (see Figs. 4 and 9) is secured near its upper edge to the knife-bar by means of countersunk screws $l^3$, a rigid adjusting-bar disposed within a groove provided in the knife-bar being adapted to bear against the lower portion of the upper knife throughout its length, while the adjustment of said bar and knife is secured by means of a row of set-screws $l^5$, provided in the knife-bar and bearing upon the adjusting-bar.

By reason of the construction above described the upper knife, which is somewhat flexible and ordinarily would be liable to buckle, is reinforced and may be adjusted to engage the lower knife $m$ with the necessary force to secure a clean cut of the goods. A lug $l^6$ provided upon the upper knife extends down to the lower knife and serves as a guide for the edges of the knives, thereby preventing the overlapping thereof and resulting injury to said knives.

By referring to the drawings it will be seen that the body of the upper knife is cut away, except near the lower or cutting edge, so that the knife is thicker at the cutting edge than at any other portion. The lower knife $m$ is mounted in the machine to form an obtuse interior angle with the upper knife and its plane of movement, as shown more clearly in Fig. 5, while the upper knife is diagonally disposed with respect to the lower knife, so that their cutting edges form an acute angle, as will be more readily understood by referring to Fig. 9.

It will be seen that when the upper knife is moved downward in a vertical plane its cutting edge will be brought into engagement with the lower knife successively throughout its length, thereby securing a shearing action and a clean even cut of the goods. Inasmuch as the lower knife is disposed at an angle it is admirably adapted to withstand the strain of the cutting action, and by reason of the close engagement of the surfaces of the knives it is maintained sharp for a considerable length of time.

By forming the upper knife with an extended or thickened edge, as above described, and placing it with its cutting edge at an angle with that of the lower knife, the body of which is angularly disposed, it will be seen that the two knives engage at any moment only throughout a very small portion of their respective lengths, thereby greatly reducing the friction and force required to actuate the upper knife. In other words, these two knives engage each other at the time only when the small diamond-shaped areas are successively brought into contact as the upper knife is moved past the lower one, which obviously reduces the frictional surface engagement which would be present were the ordinary form of knife employed. In addition the disposition of the lower knife at an angle facilitates grinding the same and, furthermore, provides room for the movable section or angle-iron $n'$, which I will more fully describe. This movable section embodies the means employed in my machine for securing the engagement of the goods with the edge of the lower knife at the moment of cutting, while permitting their disengagement therefrom, whereby the gripping-fingers $h'$ are permitted to seize and draw out the goods after cutting. This result I have found highly advantageous in cutting the class of goods for which my machine is particularly designed.

The lower knife is fastened to the carriage M by a row of screws $m'$, and thus the lower knife $m$ can be adjusted by the set-screws $m^2$, the holes for the screws $m'$ being slotted.

The carriage M, Fig. 3, has suitable arms $m^3$ to reach halfway around the hub of cam $k'$, between the cam $k'$ and the collar $k^6$, which latter is keyed to the hub of said cam $k'$. On the carriage M are the boxes $m^4$, which serve as nuts for the spindles $m^5$. The other bearing $m^6$ of the spindle is bolted to the frame A, and between the two bearings is the collar $m^7$, rigid on the spindle. On one end of the spindle is keyed the bevel-gear $m^8$, which is driven from the corresponding bevel-gear $m^9$, Fig. 1, on the shaft, which has a square head $m''$, and can be reached with a suitable key through the space formed by the arms of the fly-wheel B', and by turning the same the carriage M, which slides by means of the guides on the frame A, is moved, and with it the cams, yoke, upper and lower knives, and all other attachments. The carriage M, Figs. 4 and 5, is further provided with the boxes N to receive the lower ends of the studs $n$ $n$. These studs go through suitable holes at the end of the movable section $n'$, which is clamped to the shoulder $n^2$ with the nut $n^3$. The stud $n$ is slipped through the eye of box $n^4$, which is firmly bolted to the knife-bar L. The upper end of the stud $n$ carries the arm $n^5$, with the half-boxes $n^6$.

The sheet X is carried above the movable section $n'$ between the upper knife $l^2$ and the lower knife $m$, and after cutting the knife-bar L moves upward, and with it the knife $l^2$. The eye $n^4$ will soon strike the leather cushion $n^7$ and raise the stud $n$, and with it the angle-iron $n'$, lifting the sheet X off the edge of the lower knife, Fig. 4, and enabling the fingers $h'$ $j'$ to take the edge of the sheet X between them, and to permit this the movable section is cut out at intervals, admitting the said fingers to close and pull out the sheet to the required length. By the downward motion of the upper knife the shoulder $n^2$ will soon reach the stop $n^8$, replacing the sheet X upon the edge of the lower knife $m$, and by further motion, Fig. 5, when the cutting commences, the eye $n^4$ will slide on the stud $n$.

To prevent the sheet from sliding back or its edge from turning upward, which would be the case when the cut is near the original fold or crease made when the material is folded after it is manufactured, a shaft O is laid in the half-boxes $n^6$, Figs. 1, 4, and 5, on which, between two collars, are the rings $o$, supporting the elastic pieces $o'$ and blades $o^2$, which latter are cut out to admit the fingers $l$ of the gripping mechanism. The lower edges of the blades $o^2$ rest on the sheet, holding the same on the movable section, and the position of this blade $o^2$ is so arranged that the tendency of a back pull on the part of the sheet causes the blades $o^2$ to clamp the movable section $n'$, while any wrinkle in the sheet will lift the respective section of the blades $o^2$. As the shaft O of the blades $o^2$ and the movable section $n'$ are both mounted on the same studs $n$, their relative position will not be affected by the motion of the knife-bar L, and neither by the motion of the studs $n$.

The end of the carriage M, Figs. 4 and 5, also forms a pair of half-boxes $o^3$, and the shaft $o^4$ is carried in the same, on which are the light rings $o^5$, supporting the elastic pieces $o^6$, the blade $o^7$, and the felt $o^8$. The adjustable weight $o^9$ will slightly press the oil-soaked felt $o^8$ to the edge of the upper knife $l^2$. By the down motion of the knife-bar the knife will slightly rub against the stationary oil-soaked felt $o^8$ and oil its whole surface, relieving the friction between the two knives, keeping them cool and saving their edges.

The fingers of the gripping mechanism are always kept closed by the pressure of the springs $h^3$, and the opening of the same is made as follows: On the shaft II is keyed the lever $I^2$, which is provided with a thumb $i$, Figs. 3 and 9. By the forward motion of the cross-heads $g^4$ this thumb slides up the cam $i'$, Fig. 2, forcing the lever $I^2$ up and turning the shaft II, the square bar J, the collars $h^7$ on the shaft II, and through the clutches the loose rings, pressing the springs $h^3$ back and opening the fingers. As soon, however, as the thumb $i$ of the lever $I^2$ passes the point of the cam $i'$ the lever $I^2$ is released and the tension of the springs $h^3$ operates to close the fingers. The relative positions of the other parts at the moment of closing the fingers is illustrated in Fig. 4. In the backward movement the thumb $i$ will catch at $i^2$ in the front edge of the cam, tipping it over the pivot $i^3$, and after releasing it the overweight $i^4$ will bring the cam $i'$ in its original position, while the pin $i^5$ takes up the pressure of the thumb $i$ on the cam $i'$. At the back motion of the cross-heads $g^4$ the roller P, Fig. 5, which is pivoted on the lever $I^2$, rolls up the cam $p$, forcing the lever $I^2$ up and opening the fingers, as before, and releasing the grip of the same from the sheet X. The cross-heads $g^4$, and with them the gripping mechanism, move yet farther back, leaving the sheet X entirely, as shown by dotted lines, and the sheet X drops down to the table $X'$ by its own weight and it is ready to be cut off by the knives, which position is illustrated in Fig. 5. The table $X'$ is kept away from the gripping mechanism, enabling the latter to pass above the sheet X without touching the same. The cam $p$, Figs. 3 and 5, is adjustable by means of the grooved bars $p'$, thus forming a sliding guide, the square head $p^2$ fitting in the grooves of the said bars, and the stud and nut $p^3$. The cross-heads $g^4$ are further provided with the pistons $p^4$, Fig. 2, on the piston-rods $p^5$, which pistons are received in the cylinders $p^6$, compressing the air in the cylinders, thereby providing an elastic cushion for the cross-heads and their attachments and aiding their return. The cylinders $p^6$ are provided with air-holes, which can be in part or in whole closed by turning the covers $p^7$ on the suitable threads of the cylinder, whereby the tension of the inclosed air can be regulated. After the sheet X is cut off it is folded in its middle by bringing the folding-blade R, Fig. 3, between the rollers S S', which are geared together and to the shaft $S^2$ by suitable gearing. (Not shown.) This shaft has a pulley $B^6$ and is belted to the pulley $B^5$ on the driving-shaft B. As is seen on the drawings, the rollers are driven in a direction to pull the sheet down the table, delivering the same to the fly $t^2$. The shaft $s'$ is in stationary bearings, while the shaft $s$ of the roller S is in movable bearings $s^2$, sliding between the guides $s^3$. The spring $s^4$ presses against this bearing $s^2$, bringing the roller S in close contact with the roller S'. Should some thicker part, such as wrinkles in the sheet, come between the rollers, the roller S will give by compressing the spring $s^4$, and the tension of the spring $s^4$ will bring the roller S back to its original position as soon as the heavier object passes the roller.

The light folding-blade R is stiffened by being screwed to the folding-bar $r$, Figs. 6 and 7, which reaches across the machine and is firmly bolted to the lugs $r'$ $r'$ of the sliding pieces $r^2$ $r^2$, and they are guided by the lugs $r^3$ of the castings $r^4$, and the latter are bolted to the sides of the frames A A. The sliding piece $r^2$ is supported and moved by the pivot $r^6$, as follows: The bolt $R^3$ of the side frame A, Figs. 2 and 7, serves as a pivot for the swinging lever $R^2$, and to impart from the swinging of the lever $R^2$ the straight up-and-down motion to the slide the end of the lever $R^2$ is provided with an open slot, formed by the jaws R' R', which receives the piece $r^5$, that turns on the pivot $r^6$. The swinging lever $R^2$ also carries the cam $R^4$ by being fastened to the same on one end, with the countersunk screw $R^5$ and with the bolt $R^6$ on the other end.

The rocking lever G has pivoted on its upper end the roller $r^7$ and brings the same between the ribs $r^8$ of the cam $r^4$. The forward swinging of the lever G forces the cam, and with it the lever $R^2$ and the folding-blade R, down. $R^7$ is an adjustable balance-weight on the arm $R^8$ of the lever $R^2$ and is so adjusted as to keep the lever and its attachments always up. To get the proper height for the end of the cam $R^4$, the set-screw $R^9$ is is used to receive the weight $R^7$ and to stop its down motion at the proper place. The downreach of the folding-blade R can be adjusted with the bolt $R^6$ in the slotted hole $r^9$ of the cam $R^4$.

The fly is moved as follows: The roller $e$ of the double lever $e'$, Fig. 2, is pressed to the edge of the cam E by the press-spring $e^2$ on the rod $e^3$, and one end of the connecting-rod $e^4$ is pivoted to the upper end of the double lever $e'$ at $e^5$, while the other end $e^6$ is pivoted to the crank $e^7$. This crank is keyed to the fly-shaft T, which is provided with two lugs $t$, Fig. 3, to receive the fly-rod $t'$, to which are bolted a number of wings $t^2$. The upper ends of these wings $t^2$ rest against the bar $t^3$, which is bolted to the brackets $t^4$ $t^4$. The fly-shaft is also provided with the balance-weight $t^5$. As soon as the roller $e$ drops on the cam E the tension of the press-spring $e^2$ comes in action by throwing the double lever $e'$ back, and through the aid of the connecting-rod $e^4$ and the crank $e^7$ the fly-wings $t^2$ are thrown down.

The cam E is set with a key and set-screw on the shaft $C^2$, so that at the moment the rollers S S' deliver the folded sheet the roller $e$ drops on the cam E, and consequently the fly-wings $t^2$ place the sheet on the table U. The resistance of the air will keep the sheet to the wings during the throw. The cam E brings the fly-wings f² back to the rod t³ to receive the next sheet.

The belt-shifter V on the rod v, Figs. 1 and 2, is connected by means of the levers v' and v² to the rod r³, ending at the place of the workman in a handle V⁴. By pushing the handle V⁴ toward the machine the machine is started, and by pulling it out the machine will stop.

The operation of the machine is as follows: The machine is first turned by hand so that the knives are open and the fingers of the gripping mechanism have just left the knife. The end of the flexible sheet is pulled over the movable section n', under the blade o², and over the edge of the lower knife m, and the driving-belt is then placed on the tight pulley. At the first revolution only the end of the sheet X is cut straight, and the upper knife rises and lifts by the studs n n the movable section n', the blade o², and the now straight end of the sheet X. The levers G G swing forward, bringing the fingers of the gripping mechanism to the knives. The thumb i of the lever I² strikes the cam i', whereby the fingers open and reach between the knives, under and above the end of the sheet X. The cam i' drops the lever I², closing the fingers h' j'. Now the levers G G are swinging back, carrying the gripping mechanism with them, and the fingers h' j', with their firm grip on the sheet X, pulls the same out till the roller P of the lever I² strikes the cam p, at which moment the fingers open again and as they move still backward leave the sheet entirely, which drops on the table X'. The upper knife is at this moment brought down and cuts the sheet off. The levers G G swing again toward the machine and bring the rollers r³ between the lugs r³ r³ of the cam R⁴ and force the folding arrangement down. The folding-blade will strike the middle of the sheet X, which is at this time lying on the table X', and forces it between the rollers S S' just at the moment when the fingers of the gripping mechanism drop again on the end of the sheet between the knives—that is to say, when the levers G G are ready and commencing their back motion—which will bring the folding mechanism up again out of the way of the gripping mechanism. The rollers S S' will pull the sheet X from the table X', and the cam E will throw the fly at the proper time to take and deliver the sheet X on the table U.

Having thus fully described my invention, what I claim, and desire to secure by Letters Patent, is—

1. In a cutting-machine, the combination with a movable knife having an extended cutting edge, of a second knife mounted adjacent to said movable knife having its body extending in a plane forming an obtuse interior angle with the plane of movement of the first knife, the cutting edges of the said knives being angularly disposed with regard to each other, and means for effecting the movement of the first knife past the cutting edge of the other knife in a predetermined plane and in the same angular relation to said knife, substantially as described.

2. In a cutting-machine, the combination with a movable knife having an extended cutting edge, of a second knife mounted adjacent to said movable knife having its body extending in a plane forming an obtuse interior angle with the plane of movement of the first knife, the cutting edges of the said knives being angularly disposed with regard to each other, means for securing the adjustment of said knives toward each other, and means for effecting the movement of the first knife past the cutting edge of the other knife in a predetermined plane and in the same angular relation to said knife, substantially as described.

3. In a cutting-machine, the combination with stationary and movable cutters, of a cutter-cleaning strip, and means for supporting the same embodying a rock-shaft and connecting-arms, and a weight or equivalent means acting to press the strip against the knife, substantially as described.

4. In a machine of the kind specified the combination with a lower stationary knife, of an upper movable knife, flexible arms pivoted to the frame of the machine and carrying at their lower ends an oiler situated adjacent to said movable knife, and devices acting upon said arms for holding said oiler yieldingly against said movable knife, substantially as described.

5. In a machine of the kind specified the combination with a stationary knife, of a movable knife, a reciprocating gripping mechanism and a movable section n' situated adjacent to the stationary knife and connected with the moving parts of the machine to be lifted when said gripping mechanism approaches the same and to descend when said gripping mechanism recedes, substantially as described.

6. In a machine of the kind specified, the combination with a stationary knife, of a movable knife, the reciprocating gripping mechanism, a movable section n' situated adjacent to said stationary knife and connected with the moving parts of the machine to be lifted and depressed by said moving parts of the machine as the reciprocating gripping mechanism advances and recedes and a plurality of blades o² mounted upon the machine and yieldingly held against said movable section, substantially as described.

7. In a machine of the kind specified the combination with a stationary knife, of a movable knife, a reciprocating gripping mechanism having movable fingers, a movable section n' situated adjacent to said stationary knife and having a notched or cut-away forward edge, connections between said section n' and a source of power for moving said section n' as the gripping mechanism reciprocates, and a plurality of yielding blades resting upon said movable section $n'$, substantially as described.

8. In a machine of the kind specified the combination with a stationary knife, of the reciprocating gripping mechanism, a movable knife, a movable section $n'$ situated adjacent to said stationary knife, and upright studs secured to said movable section $n'$ and connected with said movable knife, substantially as described.

9. In a machine of the kind specified the combination with a stationary knife, of a movable knife, a reciprocating gripping mechanism, and a movable section $n'$ situated adjacent to said stationary knife and connected with said movable knife, substantially as described.

10. In a machine of the kind specified the combination with a stationary knife, of a reciprocating gripping mechanism, a movable knife, a movable section $n'$ situated adjacent to said stationary knife, a plurality of blades yieldingly held against said movable section $n'$, studs $n$ connected with said movable section $n'$ and with the support of said blades, and a connection between said studs and said movable knife for moving the former by reason of the movement of the latter, substantially as described.

11. In a machine of the kind specified, a gripping and carrying mechanism comprising in combination a reciprocating carriage, shafts mounted upon said carriage and gearing between said shafts, a series of gripping-fingers rigidly mounted upon one of said shafts, and a series of coacting gripping-fingers loosely and independently mounted upon the other of said shafts, and a clutch mechanism between each of said loosely and independently mounted fingers and their shafts, and means for independently pressing the loosely-mounted fingers against the rigidly-mounted fingers, substantially as described.

12. The combination with a cloth-cutting machine, of a cloth-gripper comprising two parallel rock-shafts each provided with gripping devices adapted to coact to grip the cloth, the gripping devices of one of said rock-shafts being loosely mounted upon said shaft by connections permitting slight rotary movement thereon independent of each other, and a spring acting on each of said grippers to force it toward the gripping devices of the other shaft, whereby each gripping device has an independent gripping action, substantially as described.

13. In a machine of the kind specified a reciprocating gripping mechanism consisting of a movable carriage mounted upon the frame of the machine, a pivoted shaft H mounted upon said carriage, a plurality of fingers separately and rotatably mounted upon said shaft H, a plurality of springs arranged to press each of said fingers downwardly, a plurality of clutch members secured to said shaft H and engaging each of said fingers and consisting of sleeves having clutch projections adapted to engage clutch projections on said fingers, and a shaft J carrying a plurality of opposing fingers pivoted to said carriage and geared to said shaft H, substantially as described.

14. In a machine of the kind specified the combination with the folding-rollers, of a pivoted lever carrying a folding-blade, a groove or cam upon said lever, and a reciprocating member or lever having a projection adapted to enter said groove or cam, substantially as described.

15. In a machine of the kind specified the combination with the folding-rollers, of a pivoted lever $R^2$ carrying a folding-blade, the stationary and movable knives, reciprocating gripping mechanism, a movable member or lever for moving said gripping mechanism having a projection, and a groove or cam upon said folding-arm located in the path of said projection on said member or lever, substantially as described.

16. In a machine of the kind specified the combination with the folding-rollers, of the pivoted lever $R^2$ carrying a folding-blade, the stationary and movable knives, reciprocating gripping mechanism, the movable member or lever for moving said gripping mechanism, devices for adjusting the extent of movement of said member or lever, a projection on said member or lever, and an adjustable cam mounted upon said lever $R^2$ and located in the path of said projection, substantially as described.

17. In a machine of the kind specified, the combination with the folding-rollers, of a pivoted lever $R^2$ carrying a folding-blade, a groove or cam upon said lever $R^2$, a reciprocating member or lever G having a projection adapted to enter said groove or cam, devices for operating said member or lever G, a counterbalancing-weight secured to said lever $R^2$, and a stop to limit the upward movement of the outer or free end of said lever $R^2$, substantially as described.

18. In a machine of the kind specified the combination with the frame, of a movable carriage mounted thereon and carrying a stationary and a movable knife, devices for moving said carriage and for securing it in its adjusted position, a reciprocating gripping mechanism, devices for regulating the extent of movement of said gripping mechanism, and folding mechanism operated by the movement of said gripping mechanism, substantially as described.

19. In a machine of the kind specified the combination with the frame, of a carriage mounted to slide thereon, an adjusting-screw mounted upon the frame and engaging said carriage, stationary and movable knives upon said carriage, gearing for operating said movable knife, a reciprocating gripping mechanism, devices for moving said gripping mechanism and for regulating the extent of movement and a folding mechanism operated and controlled by said reciprocating gripping mechanism, substantially as described.

20. In a cloth-cutting machine, the combination with a reciprocating gripping device having upper and lower fingers, of a cutting device consisting of a stationary lower knife and a vertically-movable upper knife, a vertically-movable supporting-plate for the cloth located above the lower knife, and means for giving vertical vibratory movement to said supporting-plate, substantially as described.

21. In a cutting-machine, the combination with a gripping device adapted to seize and draw out the material to be cut, of a vertically-movable upper knife, and a coacting stationary lower knife, a movable section or support whereon the material rests, said section being placed adjacent to said lower knife, and means for securing the movement of said section from and toward the lower knife as the upper knife is raised and lowered, substantially as described.

22. In a cutting-machine, the combination with the movable knife $l^2$, of the coacting lower knife $m$, means for actuating the knife $l^2$, a reciprocating gripping mechanism adapted to seize and draw the material past the edge of the lower knife, and means for effecting the removal and replacement of the material upon the edge of knife $m$, whereby the grippers are enabled to seize said material and the same is thereafter smoothly cut, substantially as described.

23. In a machine of the class described, the combination with a stationary lower knife, of a vertically-movable upper knife, a movable section or support mounted adjacent to the lower knife and connected to be actuated by said upper knife, a horizontally-actuated gripping appliance, a folding-blade, and coacting parts and connecting mechanism adapted to secure the successive actuation of the several parts of said machine, substantially as described.

24. In a cutting and folding machine, the combination with a gripping appliance having gripping-fingers adapted to seize and draw out the material, of a lower and a vertically-movable upper knife, a support for said material mounted adjacent and relatively movable with respect to the lower knife adapted to permit the engagement of said material with the lower-knife edge at the moment of cutting, a folding-blade, and coacting parts and means for securing the successive actuation of the several parts of the machine, whereby the material is cut into predetermined lengths and folded, substantially as described.

25. The combination with a knife-beam and a flexible knife-blade attached thereto at its upper edge and having its cutting edge extending below the beam, of a rigid adjusting-bar movably mounted upon the said knife-beam, and resting in contact with the blade and means acting on said adjusting-bar for moving it relatively to the knife-beam, substantially as described.

26. In a cutting-machine, the combination with a knife-beam, of a flexible knife-blade attached near its upper edge to said knife-beam, a rigid adjusting-bar associated with said knife-blade, the same being movably mounted with respect to said knife-beam, and means for securing the adjustment of said knife-blade and bar, substantially as described.

27. In a cutting-machine, the combination with a knife-beam, of a flexible knife-blade attached near its upper edge to said knife-beam, a rigid adjusting-bar associated with said knife-blade, the same being movably mounted with respect to said knife-beam, means for securing the adjustment of said knife-blade and bar, and a coacting knife-blade disposed at an obtuse interior angle with respect to the flexible knife-blade, substantially as described.

MAURICE SPITZER.

Witnesses:
H. M. ANDERSEN,
C. M. NICHOLS.